July 25, 1967  J. K. RYE  3,332,133
METHOD OF MAKING A HYDROSTATIC SPINDLE ASSEMBLY
Filed Oct. 14, 1964  2 Sheets-Sheet 1

INVENTOR.
JOHN K. RYE
BY
ATTORNEYS

July 25, 1967　　　　　　J. K. RYE　　　　　　3,332,133
METHOD OF MAKING A HYDROSTATIC SPINDLE ASSEMBLY
Filed Oct. 14, 1964　　　　　　　　　　　　2 Sheets-Sheet 2

INVENTOR.
JOHN K. RYE
BY
*Barnes, Kisselle, Raisch Choate*
ATTORNEYS

United States Patent Office 3,332,133
Patented July 25, 1967

3,332,133
METHOD OF MAKING A HYDROSTATIC SPINDLE ASSEMBLY
John K. Rye, Beverly Hills, Mich., assignor to F. Jos. Lamb Co., Warren, Mich., a corporation of Michigan
Filed Oct. 14, 1964, Ser. No. 403,741
12 Claims. (Cl. 29—156.5)

This invention relates to a hydrostatic spindle of the type commonly used on machine tools and the method of making the same.

In many machine tools it is essential that a cutting tool be rotated or rotated and fed axially along a central axis to a very high degree of accuracy. In such arrangements, it is not uncommon to provide between the rotating surface of the spindle and the bearing support for the spindle a film of oil or the like which, in combination with the supporting member, forms the bearing for the spindle. Oil at constant volume is fed to a plurality of oil pockets spaced circumferentially around the spindle and recessed into the support surface. As the spindle is displaced radially, because of the constant volume delivered to all pockets, the pressure at one side of the spindle increases and decreases on the other side which action tends to center the spindle. Such spindles are referred to as hydrostatic spindles. An example of a machine tool wherein a spindle of this type may be used is a boring unit wherein the quill type spindle that supports the cutting tool is designed to rotate or rotate as well as reciprocate axially along the central axis of the quill.

It is understood, of course, that in order to obtain extremely high accuracy with spindles of the type referred to, the spindle must have a very close and concentric fit with the bearing member or members on which it is supported for rotation or axial reciprocation. While it is not extremely difficult to grind to a high degree of accuracy and concentricity the outer diameters of spindles, shafts, pistons and the like, the grinding of internal diameters to a high degree of accuracy, and particularly the internal diameters of axially spaced bores, to a high degree of concentricity poses very substantial problems. It is also difficult to grind internal diameters of bores perpendicular to shoulders to a high degree of accuracy and laterally spaced bores to a high degree of parallelism.

It is an object of the present invention to provide a method of making a spindle assembly wherein axially spaced bores in a bearing support member are formed to a very high degree of accuracy and concentricity with respect to a spindle which is rotatable, or rotatable and axially slidable within the bores.

A further object of the invention resides in the provision of a method of making a hydrostatic spindle assembly which insures near perfect concentricity between the bores of the bearing support and the spindle which is rotated or rotated and fed axially within the bores.

Another object of the invention resides in the provision of a spindle assembly and the method of making the same in which the bearing surfaces of the bearing support for the spindle are formed of a resin, preferably a metallic base epoxy resin, these surfaces being formed by molding the resin within the bearing support and around the spindle while the spindle is supported within the bearing support.

More specifically, the invention contemplates the forming of a highly accurate spindle assembly by initially grinding the outer cylindrical surfaces of the spindle, inserting the spindle in an oversize bore in the bearing support and injecting into the space between the spindle and the bore a resinous material, for example, an epoxy resin containing a metal filler, so that the bearing surface provided by the resin will conform exactly to the accurately ground outer cylindrical surface of the spindle. One feature of the invention resides in the formation of pockets in the resin-bearing surface for the oil or other hydrostatic fluid by attaching to the outer surface of the spindle forms which are adapted to be detached from the spindle when the spindle is withdrawn from the bearing support after the resin has been molded therearound. These forms may be of a variety of types. For example, they may be plastic forms which are adapted to be rendered fluid at elevated temperatures, so that after the resin is molded around the spindle, the spindle may be heated to render the plastic forms fluid and thereby enable removal of the spindle from the bearing support within the molded resin-bearing surface. On the other hand the forms may be made of a hardened material and secured to the shaft temporarily by such means as adhesives, etc.

Figure 1:
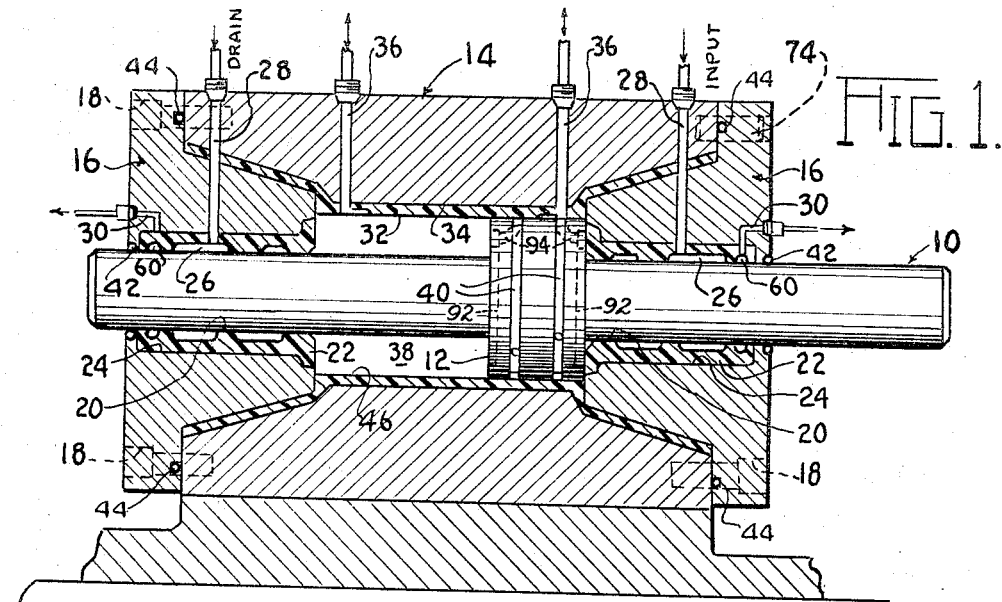
FIG. 1 is a cross-sectional view of a hydrostatic spindle assembly according to the present invention.
Figure 2:
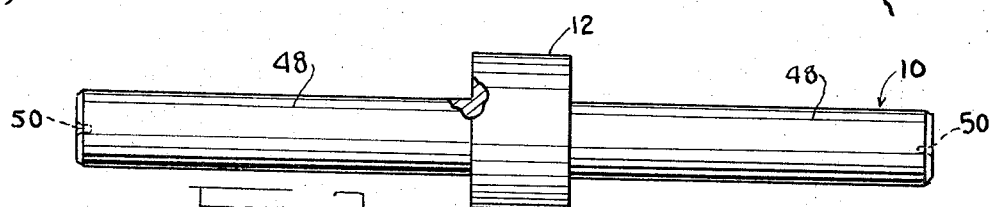
FIG. 2 is a view of the spindle illustrated in FIG. 1 prior to the complete machining thereof.

The spindle of the assembly shown in FIG. 1 includes a spindle or shaft 10 which is fashioned with a piston 12 intermediate its ends. The spindle is adapted to be rotated as well as reciprocated within a bearing support comprising a central body member 14 provided with end caps 16 at its opposite ends which are secured to the end faces of body member 14 by screws 18. Although not illustrated in the drawings, it may be assumed that one end of spindle 10 is connected with a rotating drive mechanism and the other end of the spindle directly or indirectly supports a cutting tool.

In the arrangement illustrated, the support surfaces 20 in the end caps 16 for the cylindrical end portions of shaft 10 are provided by the inner cylindrical surfaces of annular supports 22 in bores 24 in the end caps. In accordance with the present invention, supports 22 are formed of a resin, such as an epoxy resin containing metallic fillers such as brass, cast iron, etc. Many such resins are commercially available. One such resin is sold commercially as Devcon BR by Devcon Corporation, of Danvers, Mass. Within the annular supports 22 there are formed a plurality of oil pockets 26 to each of which oil at constant volume is admitted through the passageways 28 and from which the oil is discharged to drain through the passageways 30.

Piston 12 on the spindle is designed to rotate and reciprocate within a cylinder 32 molded within a central bore 34 of the body member 14. Oil passageways 36 extending from a control valve not illustrated are adapted to admit the oil to or discharge it from the opposite ends of the chamber 38 formed by the cylinder 32 and the central portions of the inner end faces of the end caps 16. As is conventional, the piston 12 is formed with a pair of spaced annular grooves 40 around the outer periphery thereof for registering with passageways 36 when the piston is disposed at either of the opposite ends of chamber 38. It will be understood, of course, that when oil under pressure is directed through one of the passageways 36 the oil on the opposite side of the piston in chamber 38 is being discharged. In the well-known manner grooves 40 communicate one with each of the opposite faces of the piston 12, so that the spindle can be fed in opposite directions at all times. The outer ends of the shaft 10 are suitably sealed within the end caps 16 such as by conventional rubber O-rings 42. Likewise, the end caps 16 are suitably sealed against the opposite end faces of body member 14 such as by rubber O-rings 44.

With the arrangement illustrated in FIG. 1, it will be appreciated that in order for the spindle to rotate and shift axially in a highly accurate manner relative to its central axis, it is imperative that the support surfaces 20 of the resin supports 22 be accurately concentric relative to the opposite end portions of the shaft 10 and that the cylindrical bearing surface 46 of cylinder 32 be accurately concentric relative to the cylindrical piston 12 on the shaft. In addition, it is extremely important that the bores formed by the two support surfaces 20 and the bearing surface 46 be absolutely concentric relative to each other. The method of this invention for forming the hydrostatic spindle assembly illustrated in FIG. 1 assures this high degree of accuracy and concentricity.

Figure 3:
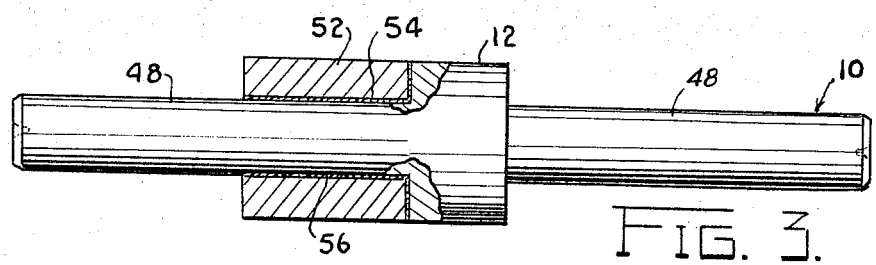
FIG. 3 is a view partly in section of the spindle illustrated in FIG. 2, having a filler bushing cemented thereon.
Figure 4:
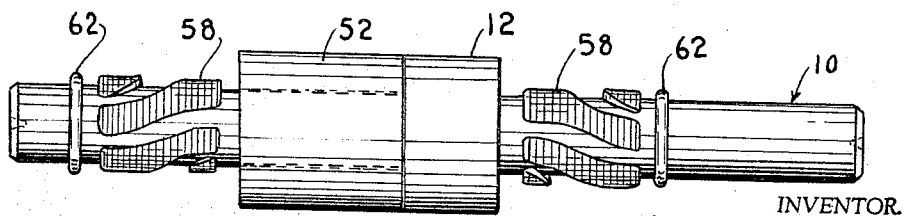
FIG. 4 is the view of the assembly shown in FIG. 3 with plastic forms attached thereto, which forms are designed to mold oil pockets in the bearing member of the completed assembly.

The initial step in practicing the method of the present invention resides in grinding the outer diameters of the two end portions 48 of the shaft to the desired size. Preferably this is accomplished by grinding these ends between centers, as is indicated by the provision of the conical sockets 50 at opposite ends of the shaft, which are formed by conventional center drilling. Thereafter there is cemented on shaft 10 a filler bushing 52. Bushing 52 can be formed of metal, for example, the same metal as the shaft 10 and piston 12 are formed from. The central bore 54 of the bushing is just slightly oversize relative to the outer diameter of the end portion 48 over which the bushing is assembled, and a suitable cement 56 is utilized between the bore of bushing 52 and the outer surface of the shaft end 48, as well as between adjacent end faces of the bushing and piston for securely affixing the bushing 52 to the shaft. While various kinds of cements or adhesives may be employed at 56 for affixing the bushing to the shaft, for reasons which will be more apparent hereinafter, the cement employed is one which retains its bonding qualities up to a temperature above the curing temperature of the resin employed. Many commercially available adhesives are suitable for use as the bonding agent between the shaft end 48 and filler bushing 52. In the showing of FIG. 3, it will be appreciated that the thickness of the layer of adhesive 56 is shown highly exaggerated merely for the purpose of illustration.

The length of bushing 52 is determined so that the combined length of bushing 52 and the width of piston 12 is equal to the desired length of the cylinder chamber 38 in which the piston is intended to reciprocate and rotate. After bushing 52 is firmly affixed to the shaft, the outer cylindrical surface of bushing 52 and the outer cylindrical surface of piston 12 are ground between centers to the identical desired diameter. This of course is easily accomplished by supporting the shaft between centers at the sockets 50 and taking a continuous accurate grinding pass lengthwise across the bushing 52 and piston 12. Thus, in the assembly shown in FIG. 3, the two ends 48 of the shaft 10 are accurately ground to a desired dimension, the outer diameter of bushing 52 and piston 12 is accurately ground to a desired diameter and the outer diameters of the shaft ends 48, the bushing 52 and piston 12 are concentric to a high degree of accuracy.

Thereafter, there are attached to the outer cylindrical surface of the shaft ends 48 forms 58 which are shaped and dimensioned to mold the pockets 26 in resin supports 22 in the end caps 16. The forms 58 illustrated in the drawings are made from plastic and can be initially formed of a thermoplastic material in sheet form and cut to the desired shape or they can be molded to the desired shape from a thermoplastic material. In any event, the forms 58 are attached to the outer cylindrical surface of the shaft ends 48 in any suitable manner, such as by cementing, heating, etc. In the embodiment illustrated, forms 58 are arranged about the ends of the shaft in a generally helical fashion. They are illustrated in this manner only as a representative form of oil pockets. Any desired configuration or arrangement of oil pockets may be utilized. It is essential, however, that forms 58 be made of material which will withstand the curing temperature of the resin employed and it is also essential that the forms be attached to the spindle such that they can be removed therefrom after the resin has been cured as the spindle is withdrawn from within the molded resin bearing supports. For example, the forms may be made of a hard material such as metal and cemented in place by means of an adhesive similar to the adhesive employed for securing filler bushing 52 on spindle 10. Alternatively the forms can be temporarily affixed to the spindle by any suitable means which enable their separation therefrom after the resin forming supports 22 have been cured.

One simple way of attaching plastic forms 58 and 62 to the shaft ends is to merely heat the shaft to a temperature well below the plasticizing temperature of the plastic material from which the forms are made and sticking them to the outer surfaces of the shaft ends. For example, if the plastic material used becomes fluid at a temperature of about 350°, the forms 58, 62 can be adhered to the shaft by heating the shaft to a temperature of about 240°. This has worked particularly well with a plastic material sold commercially by Seal Peel, Inc., of Royal Oak, Mich., under the name Seal Peel.

In the specific arrangement shown it will be observed that the scavenging ring 60 with which the outlet passageway 30 communicates is in the form of a circumferentially continuous annular groove in each support 22 adjacent the outer end thereof. Thus oil at constant volume admitted to each passageway 28 flows into pockets 26 of support 22 and then between the outer cylindrical surfaces of the rod ends 48 and the support surfaces 20 to the scavenger rings 60 which are connected to drain through the passageways 30. Accordingly, there are also attached, by cementing or otherwise, to each end 48 of shaft 10 axially outwardly from the forms 58 annular forms 62. Scavenging rings 60 and outlets 30 are not essential, however, and in some applications their elimination would even be advantageous. This would be particularly true where the hydrostatic fluid is utilized to flush foreign matter away from the ends of the spindle. For example, this would be desirable in a grinding machine and in such case the coolant used for grinding could also serve as the hydrostatic fluid.

Figure 5:
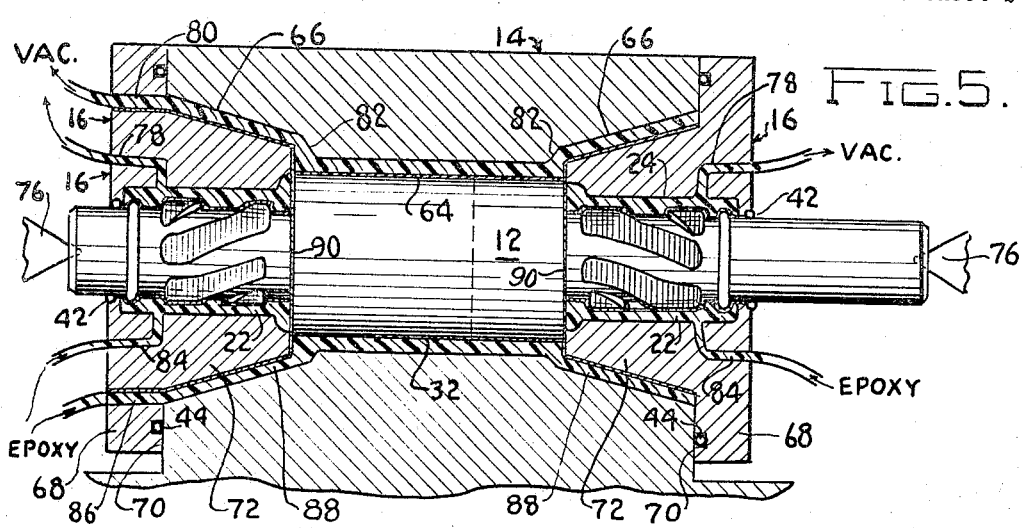
FIG. 5 is a cross-sectional view of the spindle assembly at one step in the method of making the same.
Figure 6:
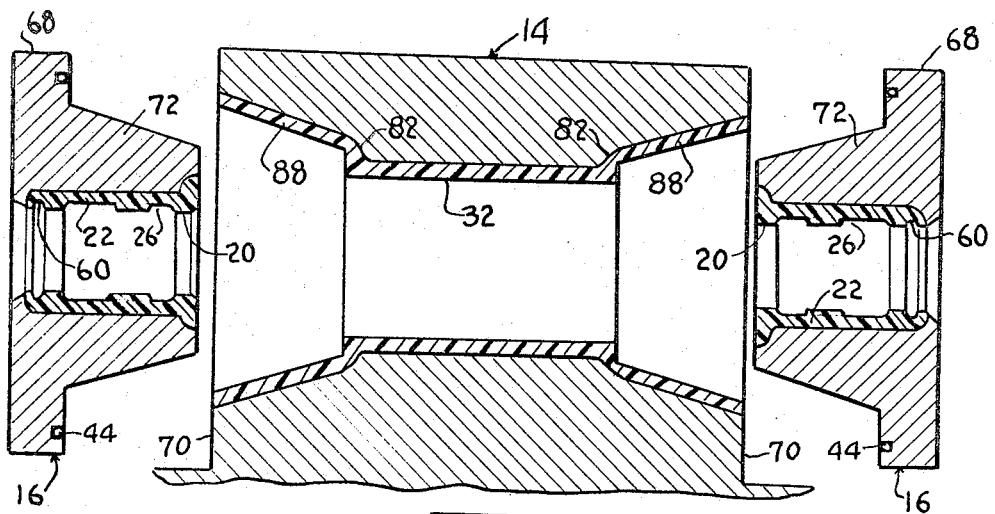
FIG. 6 is a sectional view of the bearing support for the spindle with the body portion and the end caps thereof shown separated.
Figure 7:
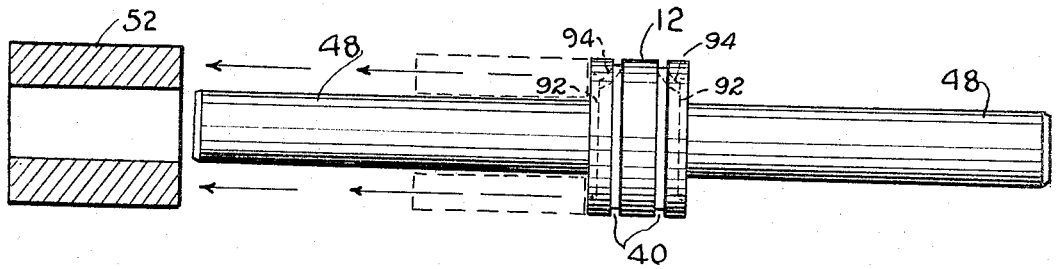
FIG. 7 shows the spindle in its finish-machined form, with the filler bushing removed therefrom.

Referring now to FIG. 5, the assembly therein illustrated discloses the manner in which the supports 22 and 32 are molded around the shaft 10 so as to produce in the final assembly a spindle of extremely high accuracy. To begin with, in order to mold the epoxy resin forming support 22 and cylinder 32 around the shaft without causing the resin to bond to the shaft, the outer surface of the shaft, together with the outer surfaces of the piston-bushing assembly 12, 52 have applied thereto a very thin coating of a parting compound. Many such parting compounds for epoxy resins are available commercially. One such parting compound is known as Devcon Release Agent, sold by Devcon Corporation, of Danvers, Mass. The layer of parting compound around the shaft and the piston-bushing assembly is indicated 64, and in FIG. 5 the thickness of this film of parting compound is shown highly exaggerated merely for the purpose of illustration.

It will be observed that each end of body member 14 is formed with a conical bore 66. Likewise, it will be noted that each end cap 16 is formed with a circular flange 68 which is adapted to abut against the end faces 70 of body member 14. In addition, the end caps 16 are formed with conical support members 72, the diameters of which are slightly less than the diameters of the conical bores 66 in the body member 14. In assembling the elements illustrated in FIG. 5, a fixture not illustrated is employed for suporting the various elements in the positions shown. The fixture includes centers 76 for supporting the shaft 10 such that the shaft is generally concentric with the bores 24 in end cap 16 and the bore 34 in body member 14. These members need not be concentrically positioned relative to one another to an extremely high degree of accuracy, but it is essential that they be firmly retained in position against relative movement. The end caps 16 are fixedly secured to the body by screws 18 and dowel pins, only one of which is shown at 74, are utilized for radial location. Preferably at least two dowel pins are used on each end cap.

In the condition shown in FIG. 5, the assembly of the shaft, the end caps 16 and the body member 14 is ready for injection of the epoxy resin. To assure completely filling the annular spaces illustrated with epoxy resin, it is desirable to first evacuate the annular cavities and then inject the resin under pressure. Thus there is formed in each end cap 16 a pasageway 78 (FIG. 5) which extends from the outer face of the end cap to the bore 24 for connection with a vacuum source. Likewise one of the end caps, the one shown at the left of FIG. 5, is formed with a second passageway 80 which extends from the outer face of the end cap to the adjacent end of the adjacent annular cavity formed between the conical boss 72 and the conical bore 66. It will be observed that the inner ends of bores 66 are fashioned with extensions 82, so that when the elements are assembled as shown in FIG. 5, the annular cavities between the bosses 72 and the bores 66 are in free communication with the annular cavity formed between the bore 34 and the outer cylindrical surface of the piston bushing assembly 12, 52. The passageways for admitting the epoxy resin under pressure to the cavities surrounding the ends of the shaft are designated 84 in each end cap, and the passageway for admitting the epoxy resin to the annular cavities between the end caps and the body, and between the bore 34 and the piston bushing assembly is designated 86. O-rings 42 form an effective seal between the end caps and the shaft, while O-rings 44 form an effective seal between the end caps and the body member 14. Thus an effective vacuum can be drawn within these cavities. After the vacuum has reached a desired value, the fluid epoxy resin with the metallic filler is caused to flow under pressure through the passageways 84 and the passageway 80. The complete molding of support 22 is assured when the resin directed through passageways 84 is visible in passageways 78. Likewise, the complete formation of the cylinder 32 together with the connected conical sleeves 88 is assured when the resin directed through passageway 86 is visible in passageway 80. The resin members so formed are shown exaggerated in thickness merely for the purpose of illustration.

In the event forms 58, 62 are formed of a thermoplastic material, after the epoxy resin has completely set, the whole assembly is heated to a temperature sufficient to render the plastic forms 58, 62 fluid. When these plastic forms become fluid, or at least semi-fluid, the two end caps 16 can be pulled off the opposite ends of the shaft, since parting compound is also applied to the conical surfaces of support members 72 of the end caps. This layer of parting compound is shown exaggerated in FIG. 5, and is designated 90. Since the layer 90 of the parting compound enables the end caps to separate from the body portion 14, and since the fluidity of the plastic from which the forms 58, 62 are formed enables axial separation of the end caps and the shaft ends 48, the end caps 16 can be completely removed from the shaft. Likewise, the shaft, by reason of the parting compound at 64, can be withdrawn from the cylinder 32. After the end caps are withdrawn from the shaft, the plastic remaining in the pockets 26, 60 can be wiped out. If the forms 58, 62 are attached to the spindle by means of an adhesive, the assembly is heated to a temperature sufficient to destroy the adhesive bond. If the forms 58, 62 are held in place on the spindle by threaded pins in passageways 28, then these pins are merely backed off to permit the spindle to be withdrawn. After the spindle is withdrawn, the metal forms 58, 62 can be simply extracted from within the bores of the resin supports 22.

After the shaft or spindle is disassembled from the body, it is heated to a temperature sufficiently high to enable removal of the filler bushing 52 from the shaft. Thereafter the outer diameter of the shaft ends 48 and the outer diameter of the piston 12 are finish lapped between centers to dimensions which will provide the desired clearances between the shaft ends 48 and the bore 20 of support 22, and between piston 12 and the bore 46 of cylinder 32. At this time the hydrostatic pads 92 on the opposite faces of piston 12 are ground and the annular grooves 40 and the orifices 94 for connecting passageways in the piston are also formed. The oil passages 30, 36 are formed in body 14 and end caps 16 after the epoxy resin supports 22 are molded therein.

When the elements are reassembled in the condition shown in FIG. 1, perfect concentricity between the shaft, the end caps and the body is assured. This is true because the parts are reassembled and dowelled in the identical positions they assumed when the epoxy resin supports 22 were molded. Thus the molding of the epoxy resin supports while the parts are clamped together in the condition illustrated in FIG. 5 compensates for any slight misalignment of these parts. In other words, although the epoxy resin supports might not, in and of themselves, be of perfectly uniform thickness, the bores 20 will be concentric with each other and will be concentric with the bore 46. The high degree of accuracy of the spindle movement is assured because, as pointed out previously, it is a relatively simple matter to grind and lap the outer surfaces of the spindle and piston to a high degree of accuracy and concentricity.

I claim:

1. The method of making a hydrostatic spindle assembly of the type which includes a spindle and a body in which the spindle is journalled for rotation, which includes the steps of forming the spindle such that the outer cylindrical surface portions thereof are concentric to its axis to a high degree of accuracy, forming a bore in the body which is oversize relative to the diameter of the spindle, inserting the spindle into the bore such that the spindle is generally concentric to the bore, supporting the spindle in said bore in said concentric position so that the outer cylindrical portions of the spindle form with said bore a cavity extending circumferentially around the spindle, coating the spindle with a parting agent, injecting into said cavity a fluid resin suitable for providing a bearing surface for the spindle, causing said resin to set so as to form an annular resin support bonded to said bore which conforms around its inner periphery with the outer cylindrical portion of the spindle thereafter withdrawing the spindle from within said annular support, reducing the outer diameter of the spindle to a dimension which provides a desired clearance space between the spindle and the inner periphery of said annular support when the spindle is reassembled with the body, reassembling the spindle within the annular resin support, directing fluid to and into said clearance space and providing a fluid exhaust passageway from said clearance space.

2. The method called for in claim 1, including the step of forming a plurality of pockets in said annular support around said spindle and directing said fluid into said clearance space via said pockets.

3. The method called for in claim 2, wherein said pockets are formed by applying to the spindle, prior to its initial insertion into the bore of said body, releasable shim-like forms at locations where it is desired to form hydrostatic fluid pockets between the spindle and said annular resin support, releasing said forms from the spindle after the resin in the cavity has set to permit withdrawal of the spindle and removing the forms from within said annular resin support to expose said pockets after the spindle has been withdrawn.

4. The method called for in claim 2, wherein said pockets are formed by attaching to the outer cylindrical surface portions of the spindle shim-like forms at locations on the spindle where it is desired to provide a hydrostatic fluid pocket between the spindle and the inner periphery of said annular support, said forms comprising a material which is generally solid at room temperature and which becomes fluid at elevated temperature in excess of the temperature at which said resin sets, said forms being applied to the spindle prior to the initial insertion of the spindle into the bore of said body, and also including the step of heating the assembly after the resin in the cavity has set to a temperature which renders the forms sufficiently fluid to enable the spindle to be withdrawn from the resin support.

5. The method of making a hydrostatic spindle assembly of the type which includes a spindle having a piston thereon which is concentric with the spindle, the spindle being journalled in a body provided with a cylindrical bore which accommodates the piston and at least one end cap on the body closing one end of the bore, the steps comprising finishing the cylindrical end portion of the spindle and piston concentric to a high degree of accuracy, applying a parting agent to the cylindrical end portion of the spindle and to the piston, forming bores in the body and the end cap which are slightly larger in diameter than the piston and the end portion of the spindle, respectively, assembling the spindle in the body and the end cap such that a thin annular cavity is formed between the piston and the bore in the body and between the end portion of the spindle and the bore in the end cap, securing the end cap to the body in an accurately fixed relative position, injecting into said cavities a resin material which is capable of forming a bearing surface for the spindle, causing said resin to set, removing the end cap from the body and withdrawing the spindle therefrom, thereafter refinishing the piston and the ends of the spindle to dimensions which provide the desired clearances between the spindle and the body and end cap, reassembling the spindle with the body and the end cap and reassembling the end cap with the body in said accurately fixed position relative to the body.

6. The method called for in claim 5, including the step of forming on one face of the end cap a supporting portion concentric with the bore of the end cap, forming on the end of the body closed by the end cap a socket concentric with the bore in the body and oversize relative to the supporting portion on the end cap, applying a parting agent to said supporting portion, assembling the end cap with the body in said accurately fixed position such that the supporting portion projects into said socket and defines therewith an annular cavity and causing the resin to flow into said last-mentioned cavity.

7. In the method of making a hydrostatic spindle assembly of the type which includes a spindle having a piston thereon between its ends which is concentric to the axis of the spindle, the spindle being journalled in a body provided with a cylindrical bore which accommodates the piston, and the body being provided at each end with caps which form the ends of the cylindrical bore and through which the opposite ends of the spindle project, the steps comprising finishing the end portions of the spindle and the piston concentric to a high degree of accuracy, applying a parting agent to the spindle and piston, forming a bore in the body which is oversize relative to the diameter of the piston, forming a bore in each end cap which is oversize with respect to the respective end portion of the spindle, assembling the spindle in the body and in the end caps such that thin annular cavities are formed between the piston and the bore in the body and between the ends of the spindle and the bores in the end caps, securing the end caps on the body in an accurately fixed position relative to the body, injecting into said cavities a fluid resin material which is capable when set of forming a bearing surface for the spindle and the piston, causing said resin to set and to bond to the bore in the body and to the bores in the end caps, removing the end caps from the body and withdrawing the spindle therefrom, thereafter refinishing the piston and the ends of the spindle to dimensions which provide the desired clearances between the piston and the inner cylindrical surface of the resin bearing in the body bore and between the end portions of the piston and the resin bearings in the end cap bores, reassembling the spindle with the body and the end caps and reassembling the end caps with the body in said accurately fixed position relative to the body.

8. The method called for in claim 7, including the steps of forming on the inner face of each end cap a support portion concentric with the bore in the end cap, forming in each end face of the body closed by the end caps a socket concentric with the bore therein and oversize relative to the support portions on the end caps, applying a parting agent to said support portions, assembling the end caps on the body in said accurately fixed relative position so as to form an annular cavity between the support portions on the end caps and the sockets on the body, and causing said resin to flow in said last-mentioned annular cavities.

9. The method of forming a highly accurate piston-cylinder assembly in which the rod which supports the piston projects axially through a bore in the rod end of the cylinder, which comprises mounting on the rod in a position contiguous to one end of the piston a cylindrical bushing such that the combined length of the piston and bushing corresponds to at least the desired stroke of the piston in the cylinder, finishing the outer cylindrical surface of the piston-bushing assembly and the outer cylindrical surface of the rod concentric to the axis of the rod to a high degree of accuracy, initially forming the bore of the cylinder oversize relative to the diameter of the piston-bushing assembly, initially forming the bore in the rod end of the cylinder oversize realtive to the diameter of the rod, applying a parting agent to the outer cylindrical surfaces of the rod and the composite bushing and piston, inserting the rod with the piston-bushing assembly thereon into the cylinder bore and supporting it therein so that a thin annular cavity is formed between the cylinder bore and the outer finished surface of the piston-bushing assembly and a second annular cavity is formed between the bore in the rod end of the cylinder and the outer cylindrical surface of the rod, filling said cavities with a fluid resinous material adapted to bond to the cylinder and rod bores and to serve as the bearing surface for the rod and the piston, causing said resin to set, thereafter removing the bushing from the rod, refinishing the outer cylindrical surface of the rod to provide the desired clearance with the resin-formed rod bore and reassembling the rod, piston and cylinder.

10. The method called for in claim 9, including the steps of attaching to the outer cylindrical surface of the rod, prior to molding said resin, a shim-like form of a thermoplastic material, and after said resin has set heating the piston-cylinder assembly to a temperature sufficiently high to render the form fluid so as to enable the rod to be withdrawn from the rod bore of the cylinder.

11. The method called for in claim 9, including the steps of releasably attaching to the outer cylindrical surface of the rod, prior to molding of said resin, shim-like forms at locations on the rod where it is desired to form a hydrostatic fluid pocket, releasing said forms from the rod after the resin has set to enable withdrawal of the rod from the rod bore, withdrawing the rod from the rod bore and thereafter extracting said forms from the rod bore to expose said pockets prior to reassembly of the rod, piston and cylinder.

12. The method of forming a hydrostatic spindle assembly of the type which includes a rod having a piston thereon, the rod being journalled in a body provided with a cylindrical bore which accommodates the piston and at least one end cap on the body closing one end of the bore end through which the rod extends, the steps comprising mounting on the rod in a position contiguous to one end of the piston a cylindrical bushing such that the combined length of the piston and bushing corresponds to at least the desired stroke of the piston in the cylinder, finishing the outer cylindrical surface of the piston-bushing assembly and the rod concentric to a high degree of accuracy, initially forming the bores in the cylinder and in the end cap oversize relative to the piston and the portion of the rod adapted to project through the end cap, applying a parting agent to the outer cylindrical surfaces of the rod and the piston-bushing assembly, assembling the rod in the cylinder and in the end cap so that a thin annular cavity is formed between the cylinder bore and the outer finished surface of the piston-bushing assembly and a second annular cavity is formed between the bore in the end cap and the rod, securing the end cap on the body in an accurately fixed position relative to the body, filling said cavities with a fluid resinous material adapted to bond to the cylinder bore and the end cap bore and to serve as a bearing surface for the piston and rod, causing the resin to set, removing the end cap from the body and withdrawing the rod therefrom, thereafter removing the bushing from the rod, refinishing the outer cylindrical surface of the rod to provide the desired clearance with the resin-formed bearing surface in the end cap, reassembling the rod, piston and cylinder and securing the end cap on the cylinder in said accurately fixed position relative to the body.

References Cited
UNITED STATES PATENTS

| | | | |
|---|---|---|---|
| 2,397,626 | 4/1946 | Shriver | 264—267 |
| 3,026,157 | 3/1962 | Knight | 308—237 |
| 3,061,887 | 11/1962 | Clarke | 29—149.5 X |

JOHN F. CAMPBELL, *Primary Examiner.*

THOMAS H. EAGER, *Examiner.*